United States Patent
Okamoto et al.

(10) Patent No.: US 9,013,128 B2
(45) Date of Patent: Apr. 21, 2015

(54) BRUSHLESS MOTOR DRIVE DEVICE

(75) Inventors: Naoki Okamoto, Isesaki (JP); Masaki Hano, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 290 days.

(21) Appl. No.: 13/610,310

(22) Filed: Sep. 11, 2012

(65) Prior Publication Data

US 2013/0069571 A1    Mar. 21, 2013

(30) Foreign Application Priority Data

Sep. 20, 2011    (JP) ................................. 2011-204733

(51) Int. Cl.
*H02P 6/04*    (2006.01)
*H02P 6/18*    (2006.01)
*H02P 27/08*    (2006.01)

(52) U.S. Cl.
CPC ................ *H02P 6/182* (2013.01); *H02P 27/08* (2013.01)

(58) Field of Classification Search
USPC ............. 318/400.01, 400.03, 400.06, 400.08, 318/400.11, 400.2, 400.26, 400.32, 400.34, 318/599
See application file for complete search history.

(56) References Cited

U.S. PATENT DOCUMENTS

| | | | | |
|---|---|---|---|---|
| 4,912,378 A | * | 3/1990 | Vukosavic | 318/400.04 |
| 5,038,092 A | * | 8/1991 | Asano et al. | 318/811 |
| 5,255,175 A | * | 10/1993 | Uchino | 363/81 |
| 5,648,705 A | * | 7/1997 | Sitar et al. | 318/145 |
| 7,847,498 B2 | * | 12/2010 | Shibuya | 318/400.01 |
| 8,436,564 B2 | * | 5/2013 | Kern et al. | 318/400.32 |
| 8,716,966 B2 | * | 5/2014 | Nakayama et al. | 318/400.06 |
| 2002/0140395 A1 | * | 10/2002 | Tazawa et al. | 318/727 |
| 2009/0200971 A1 | | 8/2009 | Iwaji et al. | |
| 2010/0164581 A1 | * | 7/2010 | Zhang et al. | 327/175 |

FOREIGN PATENT DOCUMENTS

| | | |
|---|---|---|
| JP | 2001-119984 A | 4/2001 |
| JP | 2009-100567 A | 5/2009 |
| JP | 2009-189176 A | 8/2009 |

* cited by examiner

*Primary Examiner* — Bentsu Ro
*Assistant Examiner* — Thai Dinh
(74) *Attorney, Agent, or Firm* — Foley & Lardner LLP

(57) ABSTRACT

A brushless motor drive device switches energization modes for supplying power to two phases of a three-phase brushless motor, based on an induced voltage induced in a non-energized phase. In a case in which a target duty ratio Dt, which is a duty ratio of a PWM signal according to a manipulated variable of the brushless motor becomes less than a detection limit value Dlim, which is the lower limit of a duty ratio capable of detecting an induced voltage, there is set a detection timing (1/N) for detecting an induced voltage according to the cycle of a PWM signal, and a detection time duty ratio D1, which is a duty ratio of the PWM signal at the detection timing, is restricted to Dlim.

14 Claims, 18 Drawing Sheets

BRUSHLESS MOTOR DRIVE DEVICE

BACKGROUND OF THE INVENTION

1. Field of the Invention

The present invention relates to a brushless motor drive device, and, in particular, to a drive device which sensorlessly determines energization mode switching of a three-phase brushless motor.

2. Description of Related Art

Japanese Laid-open (Kokai) Patent Application Publication No. 2009-189176 discloses a drive system of a synchronous motor that: in a three-phase synchronous motor, detects an induced voltage (pulse induced voltage) of a non-energized phase induced by a pulse voltage; compares the level of this induced voltage with that of a reference voltage; and sequentially switches energization modes according to the result of this level comparison.

Incidentally, a pulse induced voltage of a non-energized phase is detected while a pulse-shaped voltage is being applied to two phases. However, since the pulse induced voltage oscillates immediately after the start of a voltage application, if the duty ratio of the pulse voltage is small (if the voltage application time is short), there is a possibility that the pulse induced voltage may be sampled within the oscillation period, and consequently the pulse induced voltage may be detected falsely, and the timing of switching energization modes may be misjudged.

Moreover, the magnitude of the pulse induced voltage of the non-energized phase changes according to the duty ratio of the pulse voltage, and if the duty ratio is small, the pulse induced voltage becomes below the reference voltage, resulting in a possibility that determination of the switching timing of energization modes may become impossible.

BRIEF SUMMARY OF THE INVENTION

In a drive device of a brushless motor, which switches energization modes for applying a pulse voltage according to a PWM (pulse width modulation) signal, to two phases of a three-phase brushless motor, based on a pulse induced voltage induced in a non-energized phase, the pulse induced voltage is detected at a predetermined detection timing according to a cycle of the PWM signal, and a lower limit value of a duty ratio at the time of the detection, which serves as a duty ratio of the PWM signal at the predetermined timing, is restricted.

Other objects and characteristics of the present invention may be understood from the following description with reference to accompanying drawings.

DESCRIPTION OF THE PREFERRED EMBODIMENT

Hereunder, embodiments for carrying out the present invention are described.

First Embodiment

Figure 1:
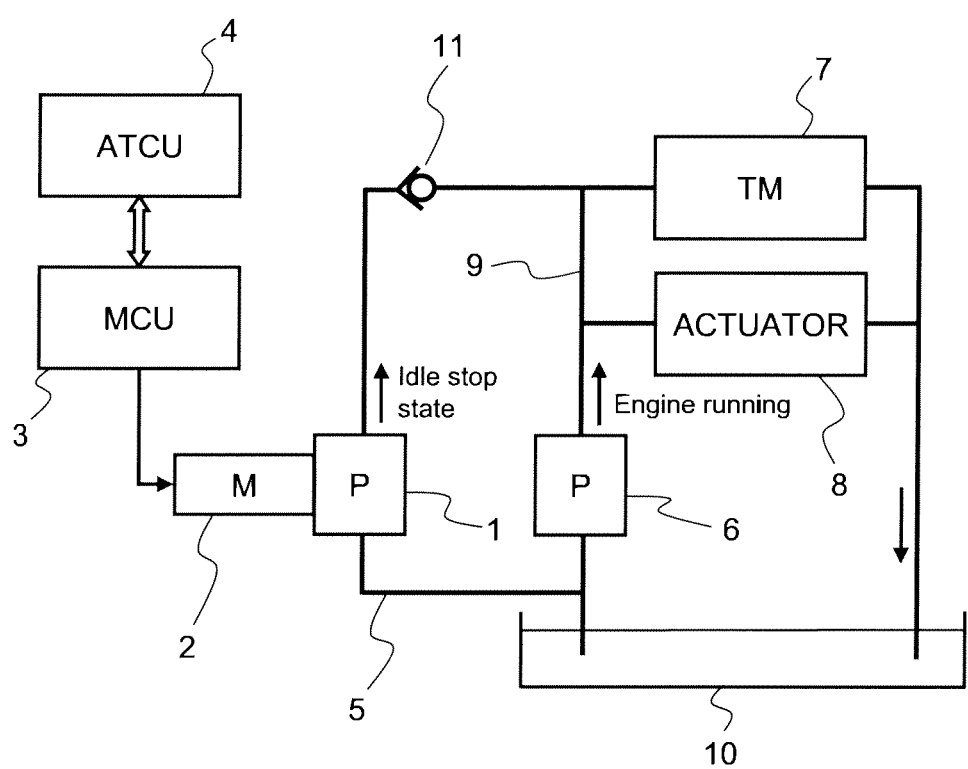
FIG. 1 is a block diagram showing a configuration of an automobile AT (automatic transmission) hydraulic pump system in a first embodiment.

FIG. 1 is a block diagram showing a configuration of an automobile AT hydraulic pump system.

In the automobile AT hydraulic pump system shown in FIG. 1, as oil pumps for supplying oil to a transmission 7 and an actuator 8, there are provided a mechanical oil pump 6 which is driven by output of an engine (internal combustion engine) (not shown in the diagram), and an electric oil pump 1 driven by a motor.

Moreover, as an engine control system, there is provided an idle stop control function which stops the engine when an automatic stop condition is met and which re-starts the engine when an automatic start condition is met. While the engine is in a stop state due to an idle stop, mechanical oil pump 6 also stops the operation thereof. Therefore during this idle stop, electric oil pump 1 is operated to supply oil to transmission 7 and actuator 8, thereby suppressing a reduction in the hydraulic pressure.

Electric oil pump 1 is driven by a directly connected brushless motor (three-phase synchronous motor) 2. Brushless motor 2 is controlled by a motor control device (MCU) 3 based on commands from an AT control device (ATCU) 4.

Motor control device (drive device) 3 drive-controls brushless motor 2 to drive electric oil pump 1, and electric oil pump 1 supplies oil in an oil pan 10 to transmission 7 and actuator 8 via an oil pipe 5.

While the engine is being operated, mechanical oil pump 6, which is driven by the engine, supplies the oil in oil pan 10 to transmission 7 and actuator 8 via an oil pipe 9. At this time, brushless motor 2 is in an OFF state (stop state) in which the flow of the oil flowing toward electric oil pump 1 is blocked by a check valve 11.

When the engine is stopped due to an idle stop, the engine rotation speed is reduced and the rotation speed of mechanical oil pump 6 is reduced, resulting in reduction in the hydraulic pressure within oil pipe 9. As a result, in synchronization with the idle stop of the engine, AT control device 4 sends a motor activation command to motor control device 3.

Upon receiving the activation command, motor control device 3 activates brushless motor 2 to rotate electric oil pump 1, and start pressure-feed of oil with electric oil pump 1.

While the discharge pressure of mechanical oil pump 6 is being reduced, when the discharge pressure of electric oil pump 1 exceeds a set pressure, check valve 11 opens, and the oil starts to circulate through passages including oil pipe 5, electric oil pump 1, check valve 11, transmission 7 and actuator 8, and oil pan 10.

In the present embodiment, brushless motor 2 drives electric oil pump 1 of a hydraulic pump system. However, in addition, it may be also a brushless motor for driving an electric water pump used for circulating cooling water of an engine in a hybrid vehicle or the like, and the target device that brushless motor 2 is to drive is not limited to an oil pump.

Figure 2:
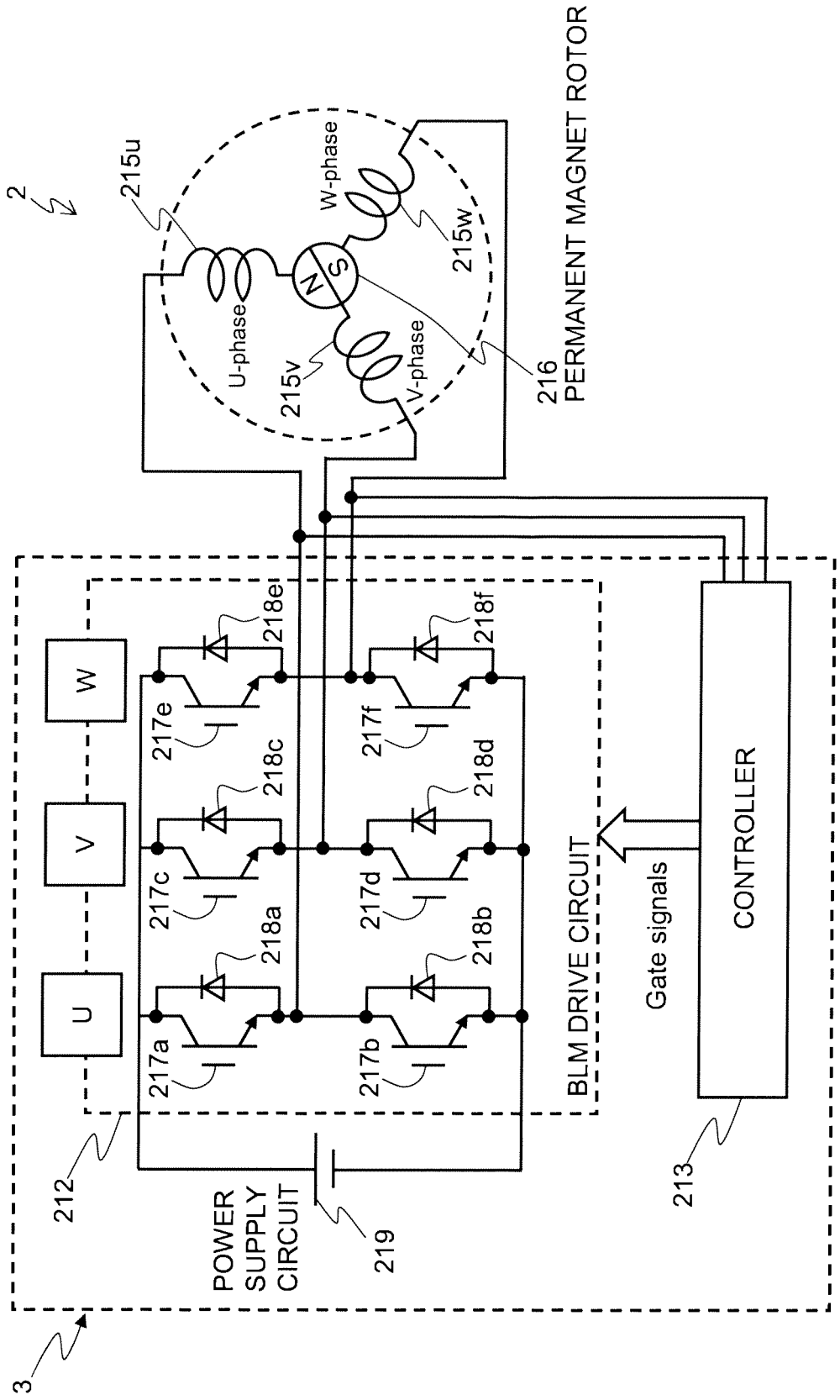
FIG. 2 is a circuit diagram showing a configuration of a motor control device and a brushless motor in the first embodiment.

FIG. 2 shows details of motor control device 3 and brushless motor 2.

Motor control device 3 is provided with a motor drive circuit 212 and a controller 213 having a microcomputer, and controller 213 performs communications with AT control device 4.

Brushless motor 2 is a three-phase DC (direct current) brushless motor (three-phase synchronous motor), and a cylindrical stator thereof (not shown in the diagram) is provided with three-phase coils 215u, 215v, and 215w of U-phase, V-phase, and W-phase. In a space formed in the center part of this stator, there is rotatably provided a permanent magnet rotor (rotor) 216.

Motor drive circuit 212 has a circuit in which switching elements 217a to 217f including anti-parallel diodes 218a to 218f are three-phase-bridge connected, and a power supply circuit 219, and switching elements 217a to 217f are configured with FETs for example.

Control terminals (gate terminals) of switching elements 217a to 217f are connected to controller 213, and switching elements 217a to 217f are controlled to be turned ON or OFF by a PWM operation performed by controller 213.

Controller 213 is a circuit which calculates an application voltage (input voltage) of brushless motor 2, and generates a PWM signal based on this application voltage, while sequentially switching selected patterns (energization modes) of two phase, to which a pulse voltage is applied, among the three phases, according to a predetermined switching timing. Controller 213, based on the PWM signal and the energization mode, determines what type of operation each of switching elements 217a to 217f of motor drive circuit 212 uses to perform switching, and it outputs six gate signals to motor drive circuit 212 according to this determination.

Controller 213 detects the predetermined switching timing in a manner described below.

That is to say, with the application of the pulse voltage to the two phases, the voltage among three phase terminal voltages Vu, Vv, and Vw of brushless motor 2, induced in the non-energized phase (pulse induced voltage) changes according to the saturation state of the magnetic circuit being changed by the position of the rotor (magnetic pole position). The detection value of this pulse induced voltage and a predetermined threshold value, which differs depending on the energization mode, are compared with each other to thereby estimate the position of the rotor, and the switching timing of the energization mode is detected.

The terminal voltage of the non-energized phase is, in a precise sense, a voltage between the ground GND and the terminal. However, in the present embodiment, the voltage of the neutral point is separately detected. The difference between the voltage of this neutral point and the voltage between the GND and the terminal is found, to thereby provide terminal voltages Vu, Vv, and Vw.

Figure 3:
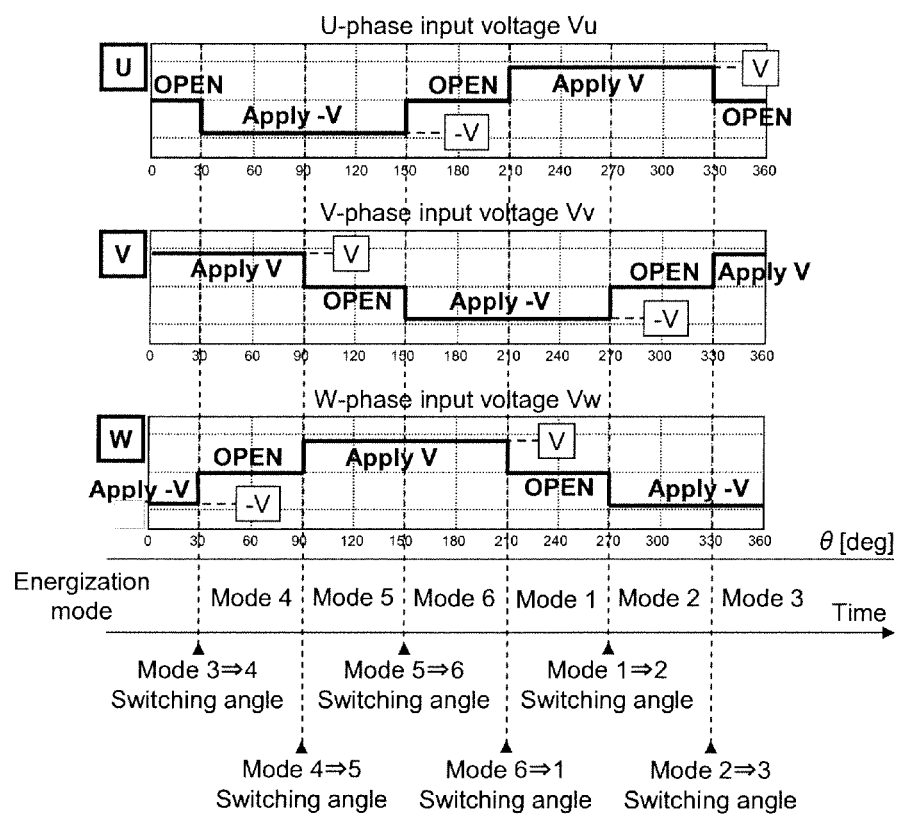
FIG. 3 is a time chart showing energization patterns of the brushless motor in the first embodiment.

FIG. 3 shows the state of voltage application to each phase in each energization mode.

The energization modes include six types of energization modes (1) to (6) which are switched sequentially at an electrical angle of every 60 degree, and in each of the energization modes (1) to (6), a pulse voltage (pulse-shaped voltage) is applied to two phases selected from the three phases.

In the present embodiment, the angle position of the U-phase coil is taken as a reference position (angle 0 degree) of the rotor (magnetic pole), and: the angle position (magnetic pole position) of the rotor which switches the energization mode from energization mode (3) to energization mode (4) is set to 30 degree; the angle position (magnetic pole position) of the rotor which switches the energization mode from energization mode (4) to energization mode (5) is set to 90 degree; the angle position (magnetic pole position) of the rotor which switches the energization mode from energization mode (5) to energization mode (6) is set to 150 degree; the angle position (magnetic pole position) of the rotor which switches the energization mode from energization mode (6) to energization mode (1) is set to 210 degree; the angle position (magnetic pole position) of the rotor which switches the energization mode from energization mode (1) to energization mode (2) is set to 270 degree; and the angle position (magnetic pole position) of the rotor which switches the energization mode from energization mode (2) to energization mode (3) is set to 330 degree.

Energization mode (1) is such that switching element 217a and switching element 217d are controlled to turn ON while all other elements are turned OFF, to thereby apply a voltage V to the U-phase, apply a voltage −V to the V-phase, and supply electric current from the U-phase toward the V-phase.

Energization mode (2) is such that switching element 217a and switching element 217f are controlled to turn ON while all other elements are turned OFF, to thereby apply a voltage V to the U-phase, apply a voltage −V to the W-phase, and supply electric current from the U-phase toward the W-phase.

Energization mode (3) is such that switching element 217c and switching element 217f are controlled to turn ON while all other elements are turned OFF, to thereby apply a voltage V to the V-phase, apply a voltage −V to the W-phase, and supply electric current from the V-phase toward the W-phase.

Energization mode (4) is such that switching element 217b and switching element 217c are controlled to turn ON while all other elements are turned OFF, to thereby apply a voltage V to the V-phase, apply a voltage −V to the U-phase, and supply electric current from the V-phase toward the U-phase.

Energization mode (5) is such that switching element 217b and switching element 217e are controlled to turn ON while all other elements are turned OFF, to thereby apply a voltage V to the W-phase, apply a voltage −V to the U-phase, and supply electric current from the W-phase toward the U-phase.

Energization mode (6) is such that switching element 217e and switching element 217d are controlled to turn ON while all other elements are turned OFF, to thereby apply a voltage V to the W-phase, apply a voltage −V to the V-phase, and supply electric current from the W-phase toward the V-phase.

In the case of the above energization modes, for example in energization mode (1), switching element 217a and switching element 217d are controlled to turn ON while all other elements are turned OFF, to thereby apply a voltage V to the U-phase, a voltage −V to the V-phase, and supply electric current from the U-phase toward the V-phase. However, it is possible to perform energization control in the respective energization modes (1) to (6) in a complementary control method in which switching element 217c on the upper stage is driven with a PWM signal in the phase opposite of the PWM signal which drives switching element 217d on the lower stage, and switching element 217c on the upper stage is turned OFF when switching element 217d on the lower stage is ON, and switching element 217c on the upper stage is turned ON when switching element 217d on the lower stage is OFF.

As described above, power is supplied to the respective switching elements 217a to 217f at the electrical degree of every 180 degree during the period of 120 degree by switching these six energization modes (1) to (6) at the electrical degree of every 60 degree. Therefore the energization method shown in FIG. 3 is referred to as a 120 degree energization method.

Figure 4:
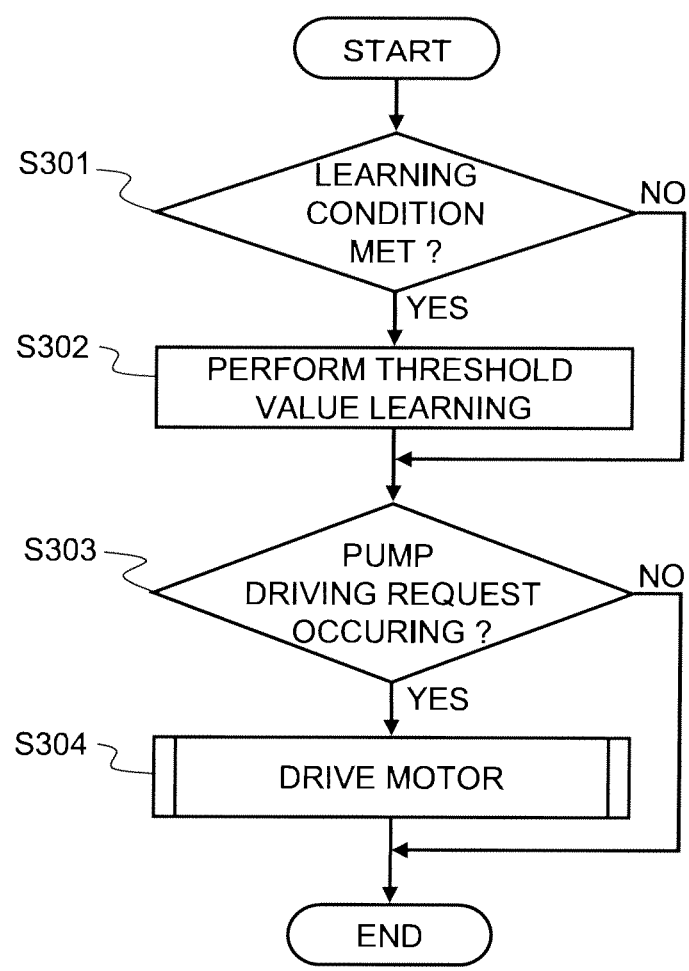
FIG. 4 is a flow chart showing a main routine of drive control of the brushless motor in the first embodiment.

FIG. 4 schematically shows drive control of brushless motor 2 repeatedly performed every predetermined length of time in motor control device 3.

Incidentally, pulse induced voltage of the non-energized phase, which is detected for switching timing determination, varies due to manufacturing variations in brushless motor 2 and detection variations in the voltage detection circuit. Therefore, if a fixed value is used as a threshold value with respect to the resultant induced voltage variation, the timing of energization mode switching may be falsely determined.

For this reason, there is performed a learning process in which by detecting a pulse induced voltage at a magnetic pole position corresponding to the timing of energization mode switching, a correction is performed to bring the threshold value to the vicinity of the induced voltage that occurs at the actual switching timing, and the threshold value preliminarily stored in controller 213 is re-written with the correction result.

In step S301, it is determined whether or not a condition for learning a threshold value to be used for determining the timing of energization mode switching is met.

Specifically, the threshold value learning condition is that there is no request for driving brushless motor 2 occurring, immediately after the electric power begins to be supplied, or immediately after electric oil pump 1 is stopped.

If the learning condition is met, the process proceeds to step S302 to perform threshold value learning.

An example of a threshold value learning process is illustrated below.

For example, in the case of learning a threshold value V4-5 to be used for determining switching the energization mode from energization mode (4) to energization mode (5), first, rotor 216 is positioned at an angle corresponding to energization mode (3).

When application voltages corresponding to energization mode (3), that is, Vu=0, Vv=Vin, and Vw=−Vin are applied to the respective phases, permanent magnet rotor 216 is attracted to the synthetic magnetic flux of the U-phase, the V-phase, and the W-phase, and torque is generated. As a result, the N pole of permanent magnet rotor 216 rotates to the angle 90 degree.

After having applied voltages corresponding to energization mode (3), a length of time required for rotor 216 to rotate to the angle 90 degree is allowed to elapse, and it is estimated that positioning to the angle 90 degree has completed.

The angle 90 degree, at which rotor 216 is attracted, when phase energization corresponding to energization mode (3) is performed is an angle position at which the energization mode is switched from energization mode (4) to energization mode (5).

Having positioned rotor 216 to angle 90 degree, then, the voltage application pattern is switched from the voltage application pattern corresponding to energization mode (3) to the voltage application pattern corresponding to energization mode (4), that is, Vu=−Vin, Vv=Vin, and Vw=0.

Then, there is detected a terminal voltage Vw of the W-phase, which is the non-energized phase of energization mode (4) immediately after the application voltage has been switched from the application voltage corresponding to energization mode (3) to the application voltage corresponding to energization mode (4), and based on this terminal voltage Vw, the threshold value V4-5 to be used for determining switching from energization mode (4) to energization mode (5) is updated and stored.

That is to say, switching from energization mode (4) to energization mode (5) is set to be performed at angle 90 degree as described above, and whether or not the angle 90 degree has been reached, in other words, whether or not the switching timing has become the timing for switching from energization mode (4) to energization mode (5) is determined based on the terminal voltage Vw of the W-phase, which is the non-energized phase in energization mode (4).

Here, by allowing the application voltage corresponding to energization mode (3) to continue, the angle position (90 degree) for switching from energization mode (4) to energization mode (5) can be determined, and if the energization mode is switched from energization mode (3) to energization mode (4) in this state, the terminal voltage Vw of the W-phase immediately after it has been switched to energization mode (4) takes a terminal voltage V of the non-energized phase at the angle position 90 degree.

Therefore, based on the terminal voltage Vw of the W-phase immediately after switching from the state of continuing the application voltage corresponding to energization mode (3) to energization mode (4), the threshold value V4-5 to be used for determining switching from energization mode (4) to energization mode (5) is updated and stored. Furthermore, it is set so that when the terminal voltage Vw of the W-phase, which is the non-energized phase of energization mode (4), crosses the threshold value V4-5 (when the terminal voltage Vw of the W-phase=the threshold value V4-5), switching from energization mode (4) to energization mode (5) is performed.

Also for the threshold values to be used for switching other energization modes, updating and learning can be performed in a similar manner.

In the threshold value updating process, the terminal voltage V of the non-energized phase at the angle position for switching the energization mode may be directly stored as a threshold value, or the weighted average value between the previous threshold value and the terminal voltage V of the non-energized phase found at this time may be taken as a new threshold value to be stored. Furthermore, the moving average value of the terminal voltage V of the non-energized phase found several times in the past may be taken as a new voltage threshold value to be stored.

Moreover, if the terminal voltage V of the non-energized phase found at this time is a value within a preliminarily stored normal range, updating of the threshold value may be performed based on the terminal voltage V of the non-energized phase found at this time. If it falls outside the normal range, updating of the threshold value based on the terminal voltage V of the non-energized phase found at this time may be inhibited, and the threshold value maintained as it was at the previous value.

Furthermore, a design value is preliminarily stored as an initial threshold value, and in the unlearned state in which threshold value learning has never been performed, the initial value (design value) is used as the threshold value for determining the timing for switching energization modes.

Moreover, there may be set a common threshold value between mode switchings such as (1)→(2), (3)→(4), and (5)→(6) where the voltage of the non-energized phase oscillates to the negative side with respect to the reference voltage, and there may be set a common threshold value between mode switchings such as (2)→(3), (4)→(5), and (6)→(1) where the voltage of the non-energized phase oscillates to the positive side with respect to the reference voltage.

Furthermore, for example, the threshold value V4-5 learned as described above is taken as a common threshold value in mode switchings such as (2)→(3), (4)→(5), and (6)→(1), and in the mode switchings such as (1)→(2), (3)→(4), and (5)→(6), a threshold value with the absolute value equal to the threshold value V4-5 may be used as a common threshold value.

However, the threshold value learning method is not limited to that described above, and various types of commonly known learning processes may be appropriately employed.

As described above, in the case in which the threshold value to be used for determining the mode switching timing is learned in step S302, and in the case in which it is determined in step S301 that the learning condition is not met, the process proceeds to step S303.

In step S303, it is determined whether or not there is occurring a request for driving electric oil pump 1 (brushless motor 2). In the case of the present embodiment, an occurrence of an idle stop request indicates an occurrence of a request for driving electric oil pump 1.

Here, if a driving request for electric oil pump 1 occurs, the process proceeds to step S304, and by comparing the voltage of the non-energized phase of the energization mode at this time with the threshold value, the timing of switching to the next energization mode is determined, and by sequentially switching the energization modes, sensorless motor drive control for driving brushless motor 2 is performed.

Activation of brushless motor 2 is performed such that for example, the energization mode is switched to energization mode (5) after having determined the position at the 90 degree position by applying the voltage according to energization mode (3) to start rotating brushless motor 2, and the angle position 150 degree for switching from energization mode (5) to energization mode (6) is determined as being reached when the voltage of the V-phase, which is the non-energized phase in energization mode (5), crosses the threshold value used for determining the switching from energization mode (5) to energization mode (6), to thereby perform switching to energization mode (6). Thereafter, the voltage of the non-energized phase is compared with the threshold value, and the energization modes are sequentially switched.

On the other hand, in the case in which there is no driving request for electric oil pump 1 occurring, step S304 is skipped and this process is finished.

Figure 5:
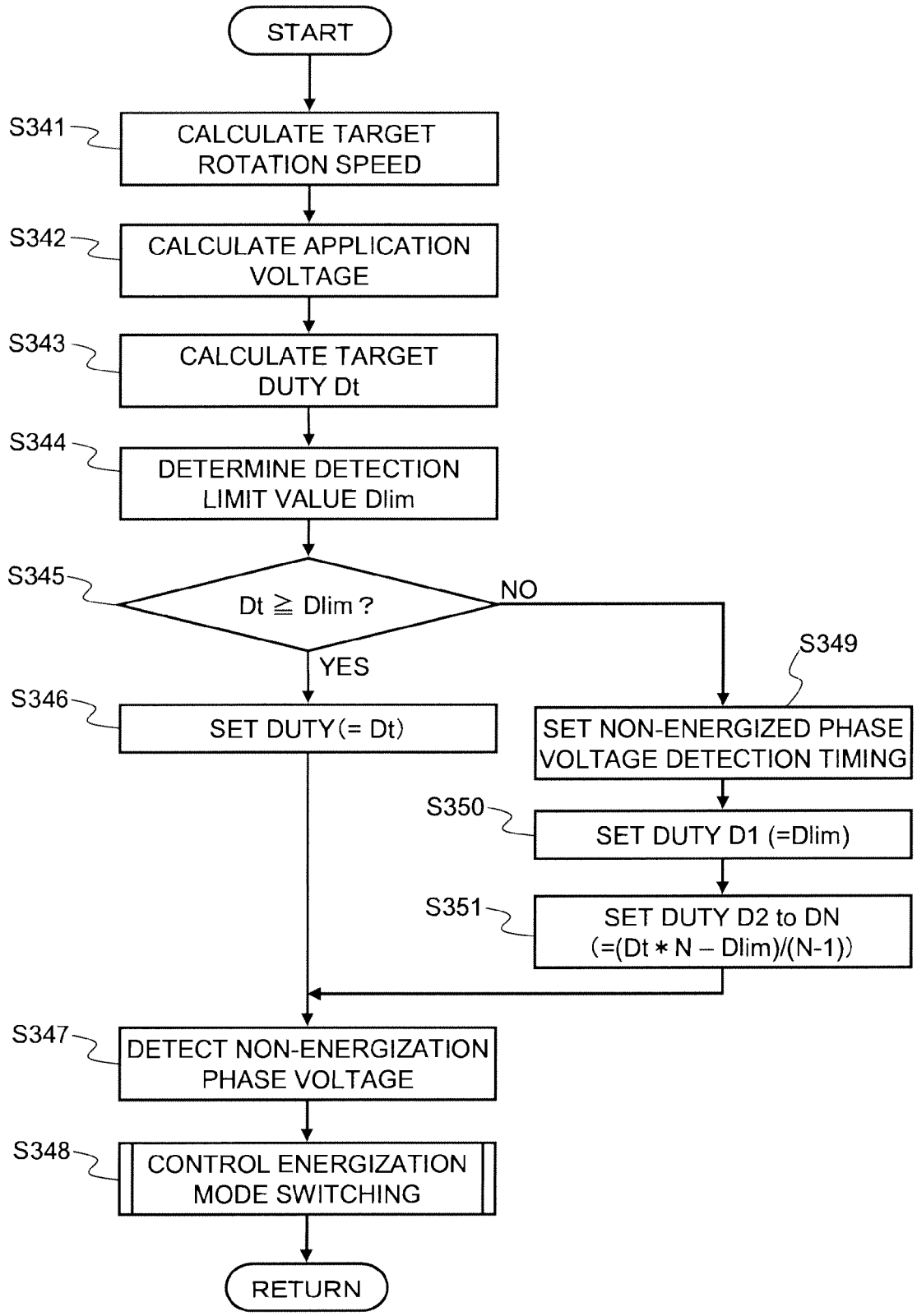
FIG. 5 is a flow chart showing details of the drive control of the brushless motor in the first embodiment.

Next, details of motor drive control in the above step S304 are described based on the flow chart of FIG. 5.

In step S341, a target rotation speed of brushless motor 2 as a manipulated variable is calculated.

Figure 6:
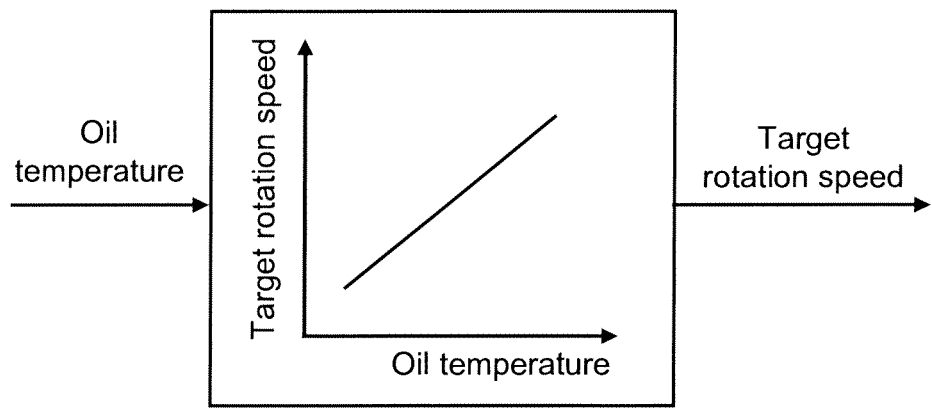
FIG. 6 is a diagram showing a characteristic of a target motor rotation speed setting in the first embodiment.

In brushless motor 2 of the present embodiment which drives electric oil pump 1 to rotate, for example, as shown in FIG. 6, the target rotation speed is set to a higher rotation speed as the oil temperature (ATF (automatic transmission fluid) temperature) becomes higher.

In the case in which brushless motor 2 drives a water pump for circulating cooling water to the engine, the target rotation speed can be set to a higher rotation speed as a cooling water temperature becomes higher.

In step S342, a command value of an application voltage (input voltage) is calculated based on the target rotation speed calculated in step S341 and the actual motor rotation speed.

For example, the command value of the applied voltage (input voltage) is determined according to the following equation by proportional-integral control (PI control) based on the deviation between the target rotation speed and the actual rotation speed.

Application voltage=rotation speed deviation×proportional gain+rotation speed deviation integral value×integral gain Rotation speed deviation=target rotation speed−actual rotation speed However, the method of determining the application voltage command value is not limited to one that is based on a target rotation speed. For example, there may be appropriately employed a commonly known determination method such as a method of determining an application voltage command value based on the deviation between a target discharge pressure and an actual discharge pressure of electric oil pump 1, or a method of determining an application voltage command value based on a requested torque. Moreover, the process of calculating the application voltage for bringing the actual value to the vicinity of the target value is not limited to proportional-integral control, and there may be appropriately employed a commonly known calculation method such as proportional-plus-integral-plus-derivative control (PID control).

In step S343, based on the application voltage (input voltage) determined in step S342, a target value Dt of a motor application duty (duty ratio) value is determined. Specifically, the target duty (%) is calculated using the following equation.

Target duty $Dt$=application voltage/power supply voltage×100

In step S344, when phase energization is PWM-controlled, there is determined a detection limit value Dlim (predetermined value), which is the lower limit of a motor application duty (duty ratio) which allows detection of the voltage of the non-energized phase. The method of determining the detection limit value Dlim is described in detail later.

In step S345, a magnitude comparison is made between the target duty Dt calculated in step S343 and the detection limit value Dlim determined in step S344. If the target duty Dt is greater than or equal to the detection limit value Dlim, the process proceeds to step S346.

In step S346, the target duty Dt as it stands is determined as being a final motor application duty, and the process proceeds to step S347.

In step S347, there is detected a voltage of the non-energized phase in the energization mode at the time. Specifically, the voltage of the W-phase is detected in the case of energization mode (1), the voltage of the V-phase is detected in the case of energization mode (2), the voltage of the U-phase is detected in the case of energization mode (3), the voltage of the W-phase is detected in the case of energization mode (4), the voltage of the V-phase is detected in the case of energization mode (5), and the voltage of the U-phase is detected in the case of energization mode (6).

Figure 7:
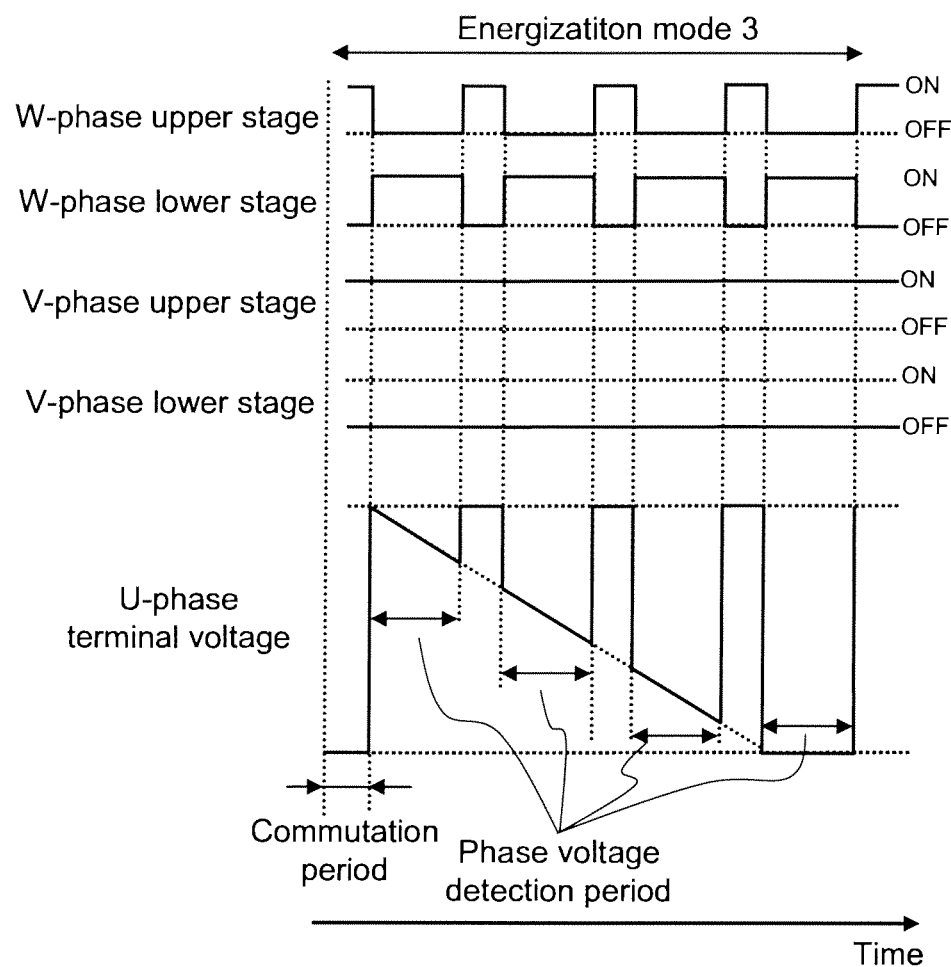
FIG. 7 is a time chart showing voltage detection periods of a non-energized phase in the first embodiment.

Here, the detection period of the terminal voltage of the non-energized phase is described, using energization mode (3) as an example, with reference to FIG. 7. In energization mode (3), a voltage V is applied to the V-phase, a voltage –V corresponding to the application voltage is applied to the W-phase by a pulse width modulation operation, and electric current is supplied from the V-phase toward the W-phase. Therefore, the voltage detection phase is the U-phase, and the terminal voltage of this U-phase is detected in the ON period of switching element 217f on the lower stage of the W-phase.

Moreover, immediately after switching the energization mode, a commutation current occurs, and if a voltage detected in the region of this commutation current occurrence is used, the timing of energization mode switching is falsely determined. Consequently, voltage detection values obtained immediately after switching the energization mode are not to be used for determining a switching timing for a set number of times from the first time. The set number of times may be variably set according to the motor rotation speed and the motor electric current (motor load), and the set number of times is set to a higher value as the motor rotation speed becomes higher and the motor electric current becomes higher.

In step S348, energization mode switching control is performed based on the terminal voltage of the non-energized phase detected in step S347.

On the other hand, in step S345, if the target duty Dt is less than the detection limit value Dlim, the process proceeds to step S349. The reason for performing a separate process from the that in the case in which the target duty Dt is greater than or equal to the detection limit value Dlim in this manner is that, as described later, in the case in which control is performed with a motor application duty lower than the detection limit value Dlim, there is a possibility that the timing of energization mode switching may be falsely determined in the sensorless control and synchronization may be lost. For this reason, in order to suppress synchronization loss of brushless motor 2 while meeting the application voltage requirement based on the rotation speed deviation to a maximum extent, the following process steps S349 to S351 are executed.

Figure 8:
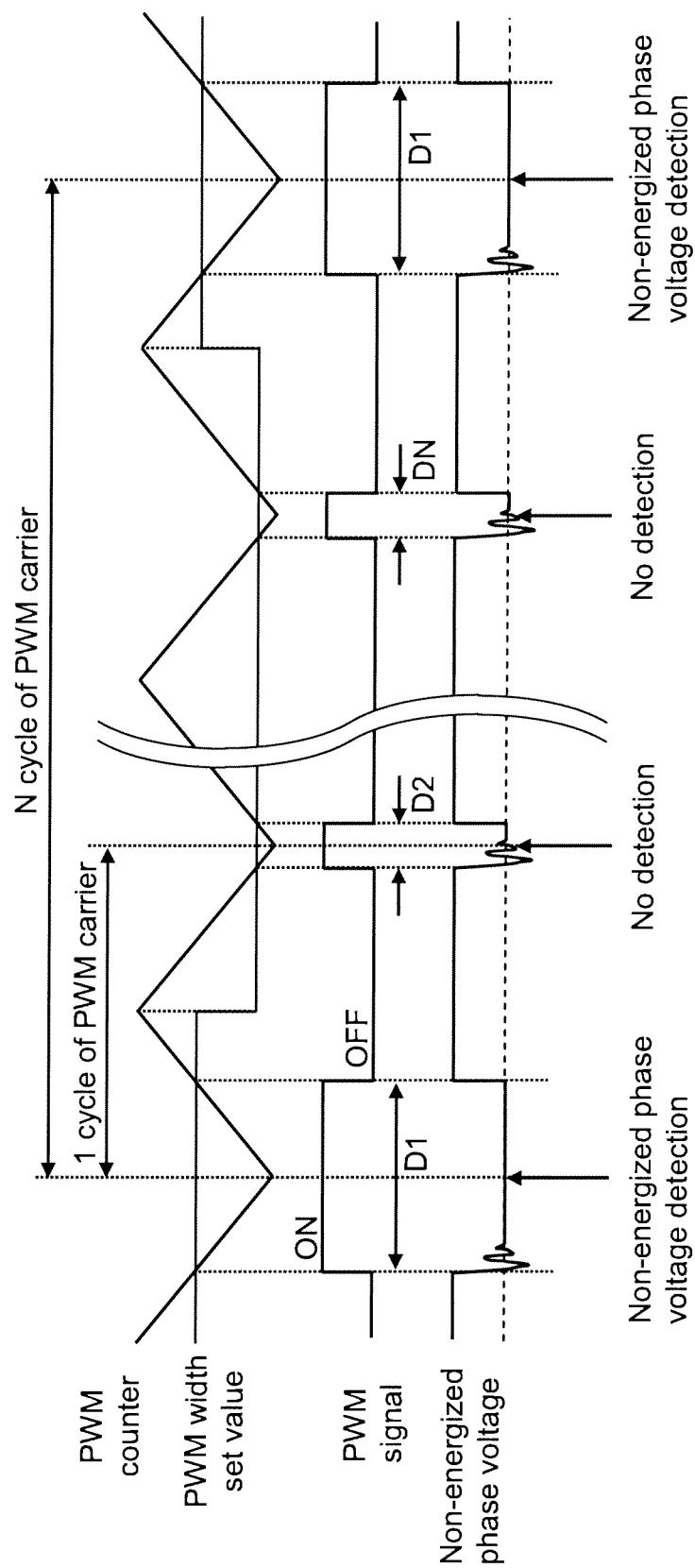
FIG. 8 is a time chart showing voltage detection timings of the non-energized phase in the first embodiment.

In step S349, there is set a detection timing for detecting the terminal voltage of the non-energized phase according to the cycle of the PWM signal. For example, as shown in FIG. 8, the value (integer not less than 1) of N in the case of detecting once in N cycles of PWN carrier is set based on various parameters such as the actual motor rotation speed, the target rotation speed, and PWM carrier frequency.

Then in step S350, based on N set in step S349, the detection time duty D1, which is a duty ratio of the PWM signal at the time of detecting the terminal voltage of the non-energized phase in step S347 during N cycles of the PWM carrier, is determined as a detection limit value Dlim. In other words, the lower limit value of the detection time duty D1 is restricted to the detection limit value Dlim.

Moreover, in step S351, according to the following equation, there is set non-detection time duties D2 to DN (>0), which are duty ratios of the PWM signal for (N−1) cycles when the terminal voltage of the non-energized phase is not detected, between continuous detection timings.

$$DN=(\text{target duty } Dt \times N - \text{detection limit value } Dlim)/(N-1) \text{ (where } N \geq 2)$$

That is to say, non-detection time duties D2 to DN are set so that the average duty Dav for N cycles of PWM carrier becomes the target duty Dt where the detection time duty D1 restricted to the detection limit value Dlim is ensured once for each N cycle of PWM carrier. The average duty Dav is calculated from the following equation.

$$Dav=(D1+D2+\ldots+DN)/N$$

If N=1, the non-detection time duties D2 to DN are not set. Moreover, in the case in which the value of N is great and N/(N−1) can be approximate to 1, the values of D2 to DN may respectively be made the target duty Dt in order to reduce the calculation load of controller 213.

By determining the detection duty D1 and the non-detection time duties D2 to DN in this manner, the minimum value Dmin of the motor application duty which can meet the requirement of the application voltage based on the rotation speed deviation while suppressing loss of synchronization of brushless motor 2 is practically expressed as the minimum value of the average duty Dav. Therefore, the minimum value Dmin is reduced from the detection limit value Dlim to the minimum value Dlim/N of the average duty Dav, and as a result, it is possible to expand the operating region of electric oil pump 1 in the low rotation speed region.

Figure 9:
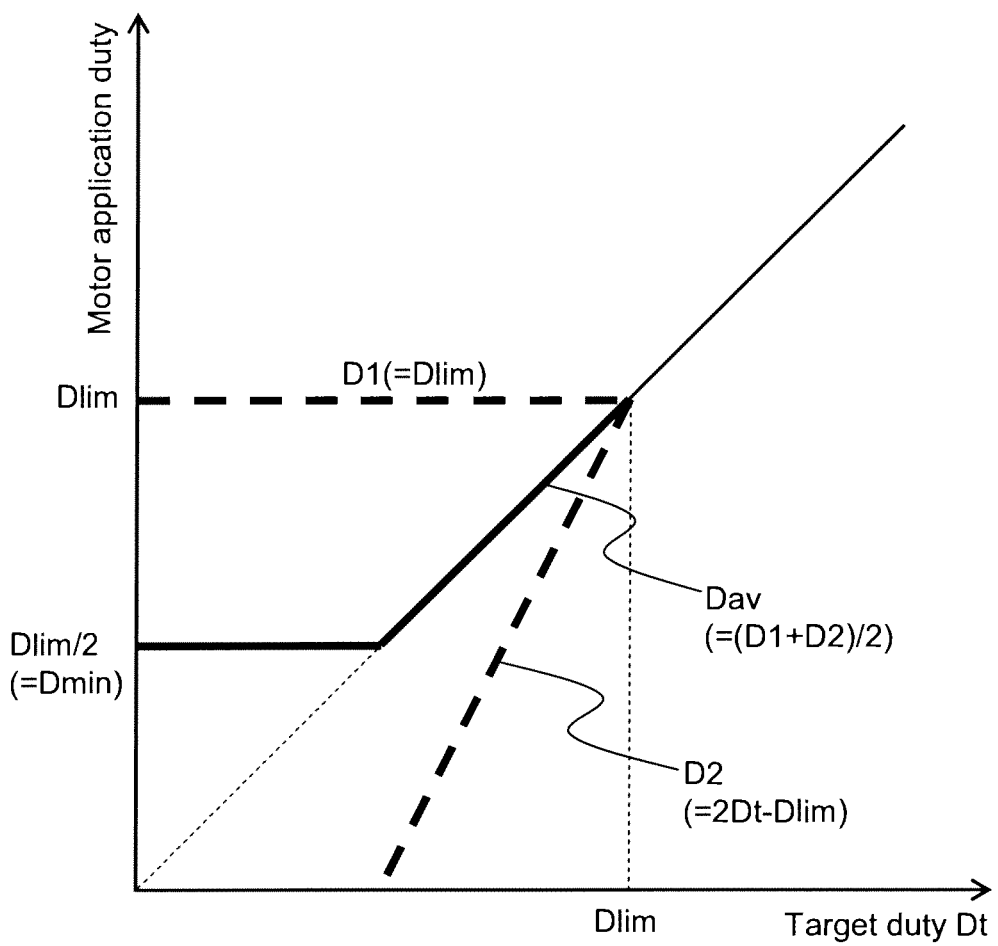
FIG. 9 is a diagram showing a relationship between a target duty and a motor application duty in a case in which the voltage detection timing of the non-energized phase is N=2 in the first embodiment.

For example, in the case in which N=2 for the detection timing for detecting the terminal voltage of the non-energized phase, as shown in FIG. 9, when the target duty Dt is less than the detection limit value Dlim, the detection time duty D1 and the non-detection time duty D2 are determined as D1=Dlim and D2=Dt×2−Dlim. Therefore, the minimum value of the average duty Dav is Dlim/2, and the minimum value Dmin is practically reduced by half with respect to the detection limit value Dlim.

Here, in step S349, the value of N is set so that it becomes smaller gradually or in a stepwise manner, that is to say, so that the interval of detection timings becomes shorter as the actual rotation speed of brushless motor 2 or the target rotation speed increases, in order to suppress loss of synchronization due to the delay in determining the timing of energization mode switching. However, since the calculation load of controller 213 becomes higher depending on the PWM carrier frequency, the minimum value of N is set while weighing the calculation load of controller 213 against synchronization loss due to the delay in determining the timing of energization mode switching.

Regarding the setting of the N value described above, in other words, the N value is set so that it becomes greater gradually or in a stepwise manner as the actual rotation speed of brushless motor 2 or the target rotation speed decreases, in order to further reduce the minimum value (=Dlim/N) of the average duty Dav. The energization mode switching interval becomes longer as the actual rotation speed or the target rotation speed decreases, and therefore, the value of N can be made large. However, the maximum value of N is restricted according to the operation-guaranteed minimum rotation speed of brushless motor 2, the number of pairs of rotor magnet poles, and the PWM carrier frequency of controller 213, so that the timing of energization mode switching can be determined.

In setting the above N value, for example, in the case in which the actual rotation speed of the brushless motor 2 or the target rotation speed is greater than or equal to a predetermined rotation speed, N is set to N=1. That is to say, it can be made a detection timing for detecting the terminal voltage for every one PWM carrier cycle. Also in the case of this type of setting, since brushless motor 2 is driven at a detection limit value Dlim higher than the target duty Dt when the rotation speed is greater than or equal to the predetermined rotation speed, the actual application voltage becomes higher than the requirement of the application voltage based on the deviation between the target rotation speed and the actual rotation speed. That is to say, the predetermined rotation speed is a rotation speed which should prioritize synchronization loss suppression over the application voltage requirement based on the rotation speed deviation.

In order to simplify control performed by controller 213, N may be set to N=1 in the case in which the target duty Dt is greater than or equal to the detection limit value Dlim.

Moreover, in step S349, the greater of either of the actual rotation speed of brushless motor 2 and the target rotation speed may be selected, and according to the selected rotation speed, the value of N may be set so as to change gradually or in a stepwise manner as described above. For example, in the case in which the actual rotation speed of brushless motor 2 is lower than the target rotation speed, the actual rotation speed is anticipated to increase toward the target rotation speed. Therefore, by pre-setting the N value to a smaller value according to the target rotation speed, synchronization loss can be suppressed and control can be performed safely.

After executing the above step S351, the process proceeds to step S347. In step S347, the terminal voltage of the non-energized phase is detected as with the case in which the target duty Dt becomes greater than or equal to the detection limit value Dlim. However, it differs in that the detection timing is once in each N cycle of PWM carrier.

Figure 10:
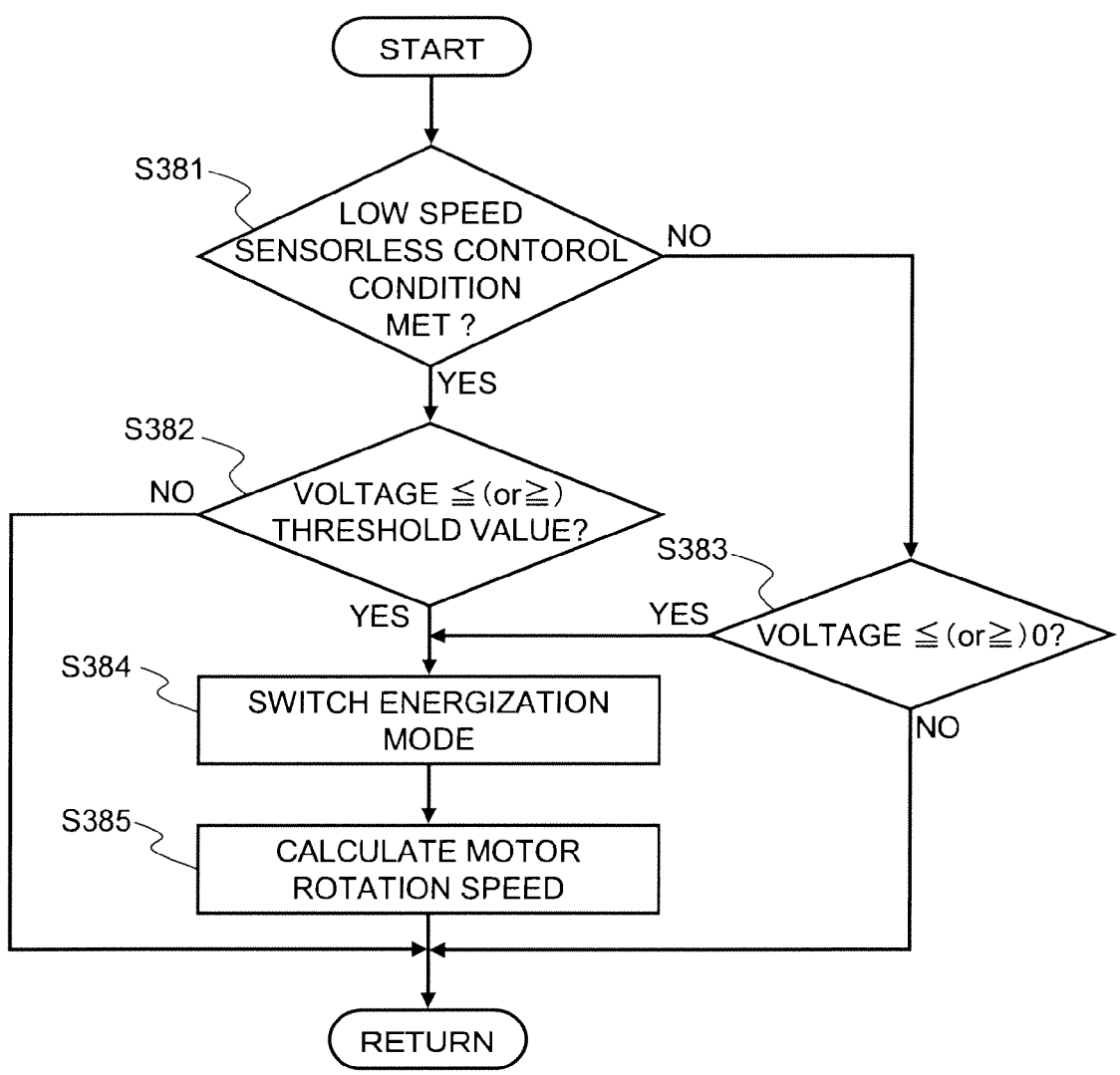
FIG. 10 is a flow chart showing details of switching control of energization mode in the first embodiment.

Next, details of energization mode switching control in the above step S348 are described based on the flow chart of FIG. 10.

In step S381, it is determined whether or not the execution condition for low-speed sensorless control is met. In sensorless control, which performs energization mode switching using a signal of an induced voltage (speed electromotive voltage) which occurs in the non-energized phase as a trigger, in the low motor rotation speed range, the induced voltage (speed electromotive voltage) becomes low and it is difficult to precisely detect the switching timing. Therefore, in the low motor rotation range, there is performed low-speed sensorless control in which switching timing is determined based on a comparison between the pulse induced voltage and the threshold value.

Consequently in step S381, whether or not it is in a speed range where determination of mode switching triggered by a speed electromotive voltage can be performed, is determined based on whether or not the motor rotation speed is higher than a set speed. That is to say, the set speed is the minimum value of motor rotation speed at which switching determination triggered by the speed electromotive voltage can be performed, and this is preliminarily determined by experiments and simulations and stored.

The motor rotation speed is calculated based on the cycle of energization mode switching. Moreover, as the set speed, for example, there may be set a first set speed for determining a shift to low speed sensorless control and a second set speed for determining a stop of the low speed sensorless control (>first set speed), to suppress repetitive sensorless control switching in a short period of time.

In step S381, if the execution condition of the low speed sensorless control is determined as being met, in other words, if the motor rotation speed is lower than or equal to the set speed, the process proceeds to step S382 to compare the voltage of the non-energized phase with the threshold value (threshold value learned in step S302), and when the voltage of the non-energized phase crosses the threshold value, a energization mode switching timing is determined and the process proceeds to step S384 to perform switching to the next energization mode.

Specifically, if the energization mode is energization mode (1) at the time, the moment when the voltage of the W-phase, which is the non-energized phase, becomes less than or equal to the threshold value V1-2 is determined as being the timing of switching to energization mode (2); if the energization mode is energization mode (2) at the time, the moment when the voltage of the V-phase, which is the non-energized phase, becomes greater than or equal to the threshold value V2-3 is determined as being the timing of switching to energization mode (3); if the energization mode is energization mode (3) at the time, the moment when the voltage of the U-phase, which is the non-energized phase, becomes less than or equal to the threshold value V3-4 is determined as being the timing of switching to energization mode (4); if the energization mode is energization mode (4) at the time, the moment when the voltage of the W-phase, which is the non-energized phase, becomes greater than or equal to the threshold value V4-5 is determined as being the timing of switching to energization mode (5); if the energization mode is energization mode (5) at the time, the moment when the voltage of the V-phase, which is the non-energized phase, becomes less than or equal to the threshold value V5-6 is determined as being the timing of switching to energization mode (6); and if the energization mode is energization mode (6) at the time, the moment when the voltage of the U-phase, which is the non-energized phase, becomes greater than or equal to the threshold value V6-1 is determined as being the timing of switching to energization mode (1).

On the other hand, in step S381, if the execution condition of the low speed sensorless control is determined as not being met, in other words, if the motor rotation speed is higher than the set speed, the process proceeds to step S383, and high speed sensorless control is performed in which the moment when it is judged that a 30 degree rotation has been further made from the moment the voltage of the non-energized phase crossed the zero level, is detected as the timing for switching to the next energization mode.

To describe in detail, the angle of 30 degree is converted into time, based on the motor rotation speed at the time, and the moment when a length of time corresponding to 30 deg from the zero-crossing moment has elapsed is determined as being the timing for switching to the next energization mode. Then, the process proceeds to step S384 to switch to the next energization mode.

In step S385, a motor rotation speed is calculated based on the energization mode switching cycle.

Here, the method of determining the detection limit value Dlim in step S344 is described in detail.

Figure 11:
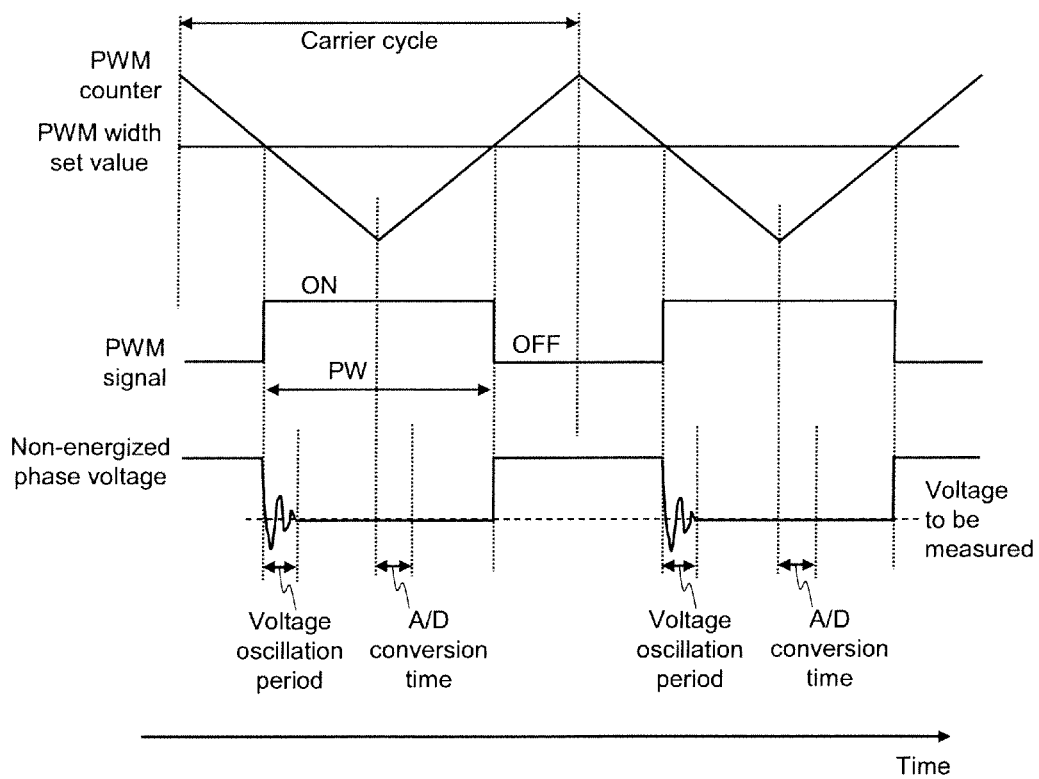
FIG. 11 is a time chart for describing a characteristic of a detection limit value setting in the first embodiment.

For example, as shown in FIG. 11, in the case in which the valley of the PWM counter where increment/decrement are repeated in each carrier cycle in the PWM control (the point at which the counter value shifts from decrement to increment), in other words, the vicinity of the center of the pulse width PW of the pulse application voltage is taken as an A/D conversion timing of the voltage of the non-energized phase (sampling timing), if the period in which the pulse induced voltage of the non-energized phase immediately after the application of pulse voltage (immediately after rising) oscillates (voltage oscillation time) is longer than ½ of the pulse width PW, an A/D conversion (sampling) of the pulse induced voltage of the non-energized phase is performed while the pulse induced voltage is oscillating, and the pulse induced voltage of the non-energized phase cannot be precisely detected.

Moreover, if the length of time required for the A/D conversion process of the pulse induced voltage of the non-energized phase (A/D conversion time from start of A/D conversion to completion of A/D conversion) is longer than ½ of the pulse width PW, the application of voltage to the energized phase stops while the A/D conversion process is being performed, and also in this case, the pulse induced voltage of the non-energized phase cannot be precisely detected, and brushless motor 2 may become out of synchronization.

Consequently, the detection limit value Dlim (%) is calculated according to equation (A).

$$D\text{lim}=\max(\text{voltage oscillation time}, A/D \text{ conversion time}) \times 2/\text{carrier cycle} \times 100 \quad \text{equation (A)}$$

According to the above equation (A), the value of twice the longer of the voltage oscillation time and the A/D conversion time is taken as the detection limit value Dlim, and it is possible to suppress the A/D conversion (sampling) of the pulse induced voltage of the non-energized phase from being performed while the pulse induced voltage is oscillating, and it is possible to suppress voltage application to the energized phase from being stopped while the A/D conversion is being performed.

In the case in which the peak of the PWM counter where increment and decrement are repeated in each carrier cycle in the PWM control (the point at which the counter value shifts from increment to decrement) is taken as an A/D conversion timing of the voltage of the non-energized phase (sampling timing), and also in the case in which the PWM switching timing is taken as an A/D conversion timing of the voltage of the non-energized phase (sampling timing), the detection limit value Dlim is calculated in the manner described above.

Furthermore, as for the voltage oscillation time and the A/D conversion time, values preliminarily found by experiments and simulations can be used, and in addition, the voltage oscillation time may be measured in step S344 to determine the detection limit value Dlim based on the measurement results.

Figure 12:
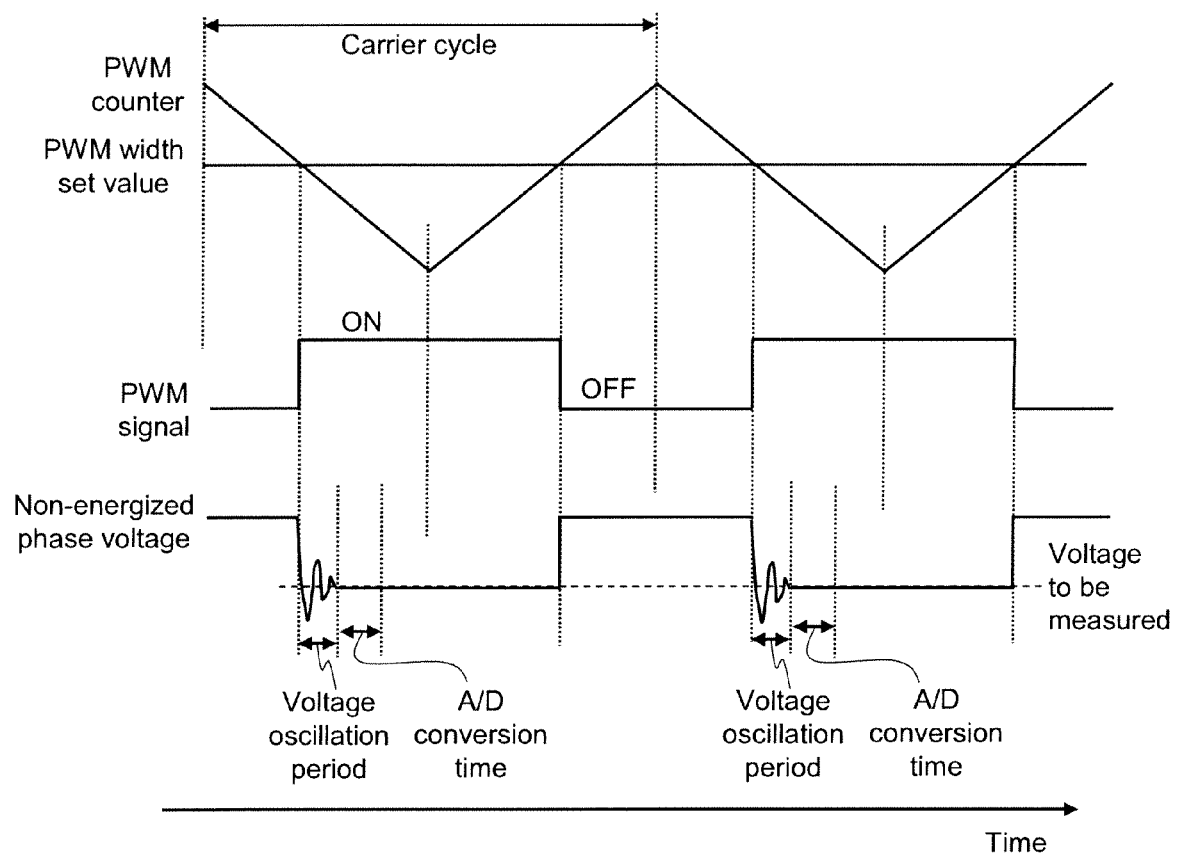
FIG. 12 is a time chart for describing a characteristic of a detection limit value setting in the first embodiment.

Moreover, in the case in which the A/D conversion timing of the voltage of the non-energized phase (sampling timing) can be set to an arbitrary timing, as shown in FIG. 12, the A/D conversion process may be started immediately after the voltage oscillation time has elapsed so that the A/D conversion (sampling) of the pulse induced voltage of the non-energized phase can be promptly performed within a short pulse. Furthermore, it is possible to suppress the A/D conversion of the pulse induced voltage of the non-energized phase from being performed while the pulse induced voltage is oscillating, and it is possible to suppress the voltage application to the energized phase from being stopped while the A/D conversion process is being performed.

Specifically, the detection limit value Dlim (%) is calculated according to equation (B).

$$D\text{lim}=(\text{voltage oscillation time}, A/D \text{ conversion time})/\text{carrier cycle} \times 100 \quad \text{equation (B)}$$

That is to say, with a pulse width PW greater than the sum of the voltage oscillation time and the A/D conversion time, if the A/D conversion is started immediately after the voltage oscillation time has elapsed, it is possible to suppress the A/D conversion (sampling) of the pulse induced voltage of the non-energized phase from being performed while the pulse induced voltage is oscillating, and it is possible to suppress the voltage application to the energized phase from being stopped while the A/D conversion process is being performed.

Figure 13:
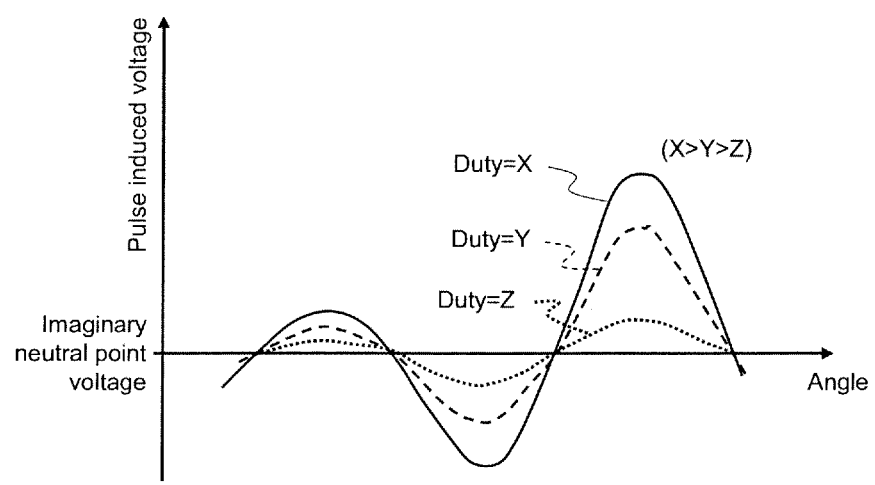
FIG. 13 is a diagram showing a correlation between a pulse induced voltage of the non-energized phase and a duty ratio in the first embodiment.

Moreover, the magnitude of the pulse induced voltage of the non-energized phase changes according to the motor application duty (duty ratio), and as shown in FIG. 13, if the motor application duty becomes smaller, the pulse induced voltage of the non-energized phase also becomes smaller, and if the motor application duty is small, the voltage becomes lower than the reference voltage. As a result, determination of the timing for energization mode switching may become impossible.

Consequently, the minimum value of the motor application duty for generating the pulse induced voltage which can be detected in the voltage detection circuit (voltage above the reference voltage) may be set as the detection limit value Dlim.

Here, among the detection limit value Dlim calculated by the above equation (A) or equation (B), and the detection limit value Dlim set based on the determination whether the pulse induced voltage is greater than the reference voltage, the greater duty ratio may be set as the final detection limit value Dlim.

If the detection limit value Dlim is set in this manner, it is possible to suppress the A/D conversion (sampling) of the pulse induced voltage of the non-energized phase from being performed while the pulse induced voltage is oscillating, and it is possible to suppress the voltage application to the energized phase from being stopped while the A/D conversion process is being performed. Furthermore, it is possible to determine the timing for energization mode switching by generating a voltage that can be detected as the pulse induced voltage, and it is possible to suppress the occurrence of synchronization loss in the brushless motor 2.

Consequently, with the above hydraulic pump system, it is possible to stably supply oil from electric oil pump 1 while being in the idle stop state, and reduction in the hydraulic pressure can be effectively suppressed. Moreover, in the case of driving a water pump with brushless motor 2, circulation of cooling water can be stably performed, and overheating of the engine can be suppressed.

In addition to the restriction based on the detection limit value Dlim of the motor application duty, in order to increase the length of time for continuously applying the pulse voltage, the carrier cycle may be changed to the incremental side (carrier frequency may be changed to the decremental side).

Furthermore, when learning the threshold value for determining the timing for energization mode switching, the learning may be performed in the state in which the motor application duty (duty ratio) is set as the detection limit value Dlim.

The reason for this is that if threshold value learning is performed in the state in which a motor application duty greater than the detection limit value Dlim is set, the pulse induced voltage becomes smaller as the motor application duty is smaller as shown in FIG. 13. Therefore, in the case in which the motor application duty becomes smaller than that at the time of learning, the pulse induced voltage may not cross the threshold value and energization mode switching may become impossible.

Consequently, the threshold value learning is performed in the state in which the motor application duty at the time of detecting the pulse induced voltage is set as the detection limit value Dlim being the minimum value, so that even if the motor application duty becomes the minimum value, the pulse induced voltage reaches the threshold value and the timing for energization mode switching can still be determined.

Furthermore, as described above, in the case in which the threshold value learning for determining the timing for energization mode switching is performed in the state in which the pulse voltage is being applied with the duty ratio of the detection limit value Dlim, as described below, the detection limit value Dlim may be corrected with respect to changes in the motor temperature and the motor power supply voltage.

Figure 14:
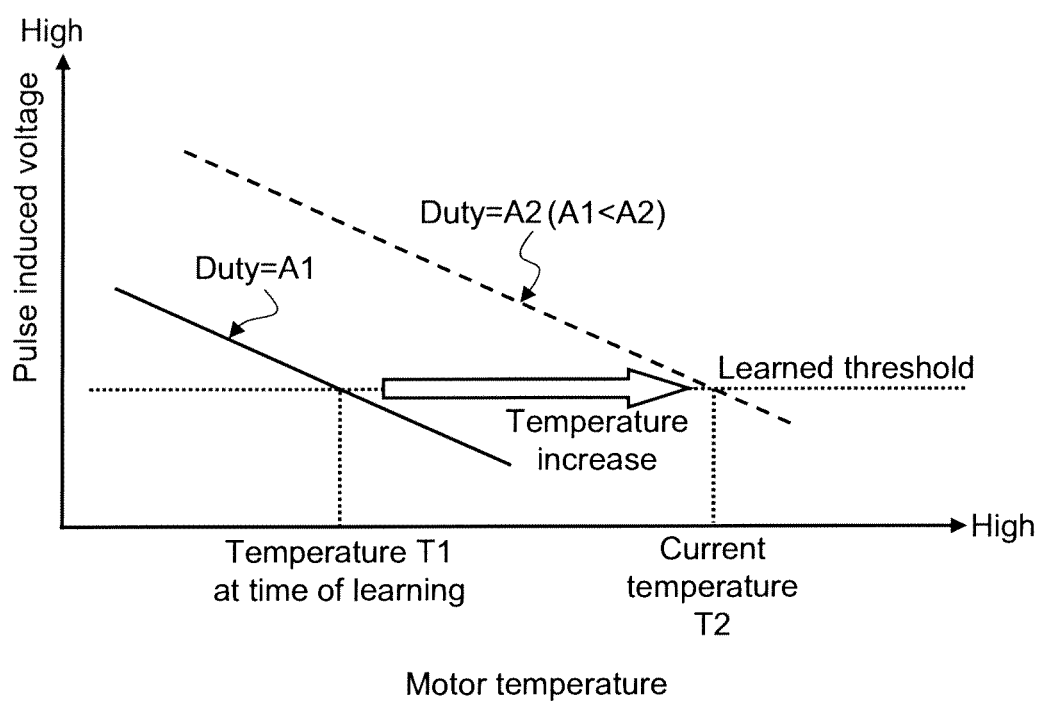
FIG. 14 is a diagram showing changes in the pulse induced voltage due to motor temperature in the first embodiment.

As shown in FIG. 14, in the case in which the motor application duty (duty ratio) when the threshold value is learned is taken as A1 (A1=Dlim) and the motor temperature when the threshold value is learned is taken as T1, if the motor temperature becomes T2, which is higher than T1, the absolute value of the actual pulse induced voltage at the energization mode switching timing (magnetic pole position for performing switching) is reduced. That is to say, if the motor temperature rises in the state in which the duty ratio is fixed at the detection limit value Dlim, the absolute value of the actual pulse induced voltage at the energization mode switching timing is reduced. Therefore, if the threshold value learned when the motor temperature is low is used, as it is, under a condition with a higher motor temperature, the pulse induced voltage does not reach the threshold value, and determination of the timing for energization mode switching may become impossible in some cases.

Consequently, in the case in which the motor temperature becomes T2, which is higher than the motor temperature T1 at the time of learning, the detection limit value Dlim is incrementally corrected so as to compensate the reduction in the level of pulse induced voltage due to the rise in the motor temperature, to thereby increase the pulse induced voltage in the case in which the motor application duty is set as the detection limit value Dlim, so that it is maintained in the vicinity of the pulse induced voltage at the time of learning. In other words, the detection limit value Dlim is changed in the direction of suppressing changes in the pulse induced voltage associated with the motor temperature at the energization mode switching timing where the duty ratio is set as the detection limit value Dlim.

Specifically, the correlation of the duty increment correction amount with respect to the rise in the temperature from the time of learning is preliminarily found and stored, and the duty increment correction amount is found from the difference between the motor temperature T2 at the time and the motor temperature T1 at the time of learning, to thereby incrementally correct the detection limit value Dlim with this increment correction value. In the example shown in FIG. 14, a correction is made by changing the detection limit value Dlim from the duty ratio A1 to the duty ratio A2.

As a result, even if the motor temperature changes to rise from the motor temperature at the time of threshold value learning, the timing for energization mode switching is determined based on the comparison between the pulse induced voltage and the threshold value, and energization mode switching can be performed sequentially.

In the case of the hydraulic pump system of the present embodiment, the motor temperature can be represented by the oil temperature or the like, and the oil temperature can be detected directly with a sensor. In addition, it can be estimated based on the operating condition of the engine. Moreover, there may be provided a sensor for detecting the temperature of the motor (coil).

Furthermore, in the case in which no means for detecting or estimating the motor temperature is provided and the motor temperature is unknown, the detection limit value Dlim is preliminarily incrementally corrected, so that, even if the motor temperature reaches the maximum temperature, the timing for energization mode switching can be determined based on a comparison between the pulse induced voltage and the threshold value.

Moreover, in the case in which the motor temperature has decreased since the time of learning, the actual pulse induced voltage changes to increase at the timing for energization mode switching. In this case, if the detection limit value Dlim is decrementally corrected within a range in which the voltage of the non-energized phase (opened phase) can be precisely detected, the actual pulse induced voltage is maintained in the vicinity of the pulse induced voltage at the time of learning. However, in the case in which the pulse induced voltage changes to increase, energization mode switching can be determined based on the comparison with the threshold value. Therefore, if at least the detection limit value Dlim is incrementally corrected with respect to the incremental change in the motor temperature, it is possible to suppress the occurrence of synchronization loss.

In the case of learning the threshold value to be used for determining the level of pulse induced voltage, with the motor application duty set as the detection limit value Dlim, the threshold value can be learned for each motor temperature, and in this case, it is possible to omit correction of the detection limit value Dlim corresponding to the change in the motor temperature.

Figure 15:
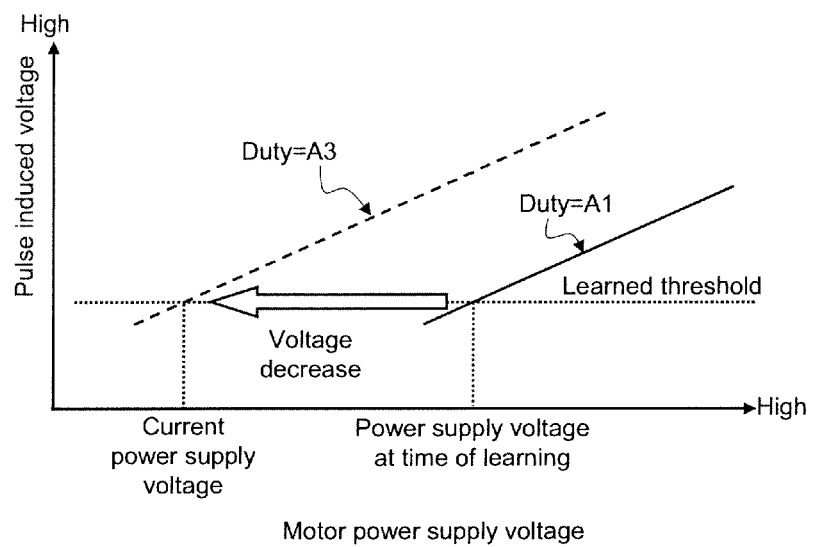
FIG. 15 is a diagram showing changes in the pulse induced voltage due to the motor power supply voltage in the first embodiment.

On the other hand, the power supply voltage of the motor also influences the absolute value of the actual pulse induced voltage at the timing for energization mode switching (magnetic pole position for switching), and as shown in FIG. 15, when the motor power supply voltage becomes lower than that at the time of learning, the absolute value of the actual pulse induced voltage at the timing for energization mode switching (magnetic pole position for switching) decreases. As a result, the pulse induced voltage does not reach the threshold value, and consequently, determination of the timing for energization mode switching may become impossible.

Consequently, in the case in which the motor power supply voltage becomes a voltage that is lower than that at the time of learning, the detection limit value Dlim is incrementally corrected so as to compensate the reduction in the level of pulse induced voltage due to the reduction in the motor power supply voltage, to thereby increase the pulse induced voltage in the case in which the motor application duty is set as the detection limit value Dlim, so that it is maintained in the vicinity of the pulse induced voltage at the time of learning. In other words, the detection limit value Dlim is changed in the direction of suppressing changes in the pulse induced voltage associated with the power supply voltage at the energization mode switching timing where the duty ratio is set as the detection limit value Dlim.

Specifically, the correlation of the duty increment correction amount with respect to the reduction in the power supply voltage since the time of learning is preliminarily found and stored, and the duty increment correction amount is found from the difference between the power supply voltage at the time and the power supply voltage at the time of learning, to thereby incrementally correct the detection limit value Dlim with this increment correction value. In the example shown in FIG. 15, a correction is made by changing the detection limit value Dlim from the duty ratio A1 to the duty ratio A3.

As a result, even if the motor power supply voltage changes to decrease from that at the time of threshold value learning, the timing for energization mode switching is determined based on the comparison between the pulse induced voltage and the threshold value, and energization mode switching can be performed sequentially.

Moreover, in the case in which the motor power supply voltage has increased since the time of learning, the actual pulse induced voltage changes to increase at the timing for energization mode switching. In this case, if the detection limit value Dlim is decrementally corrected within a range in which the voltage of the non-energized phase (opened phase) can be precisely detected, the actual pulse induced voltage is maintained in the vicinity of the pulse induced voltage at the time of learning. However, in the case in which the pulse induced voltage changes to increase, energization mode switching can be determined based on the comparison with the threshold value, and therefore, if at least the detection limit value Dlim is incrementally corrected with respect to the reduction in the motor power supply voltage, it is possible to suppress the occurrence of synchronization loss.

In the case of learning the threshold value to be used for determining the level of pulse induced voltage, with the motor application duty set as the detection limit value Dlim, the threshold value can be learned for each motor power supply voltage, and in this case, it is possible to omit correction of the detection limit value Dlim corresponding to the change in the motor power supply voltage.

Moreover, if a correction based on the motor temperature and a correction based on the power supply voltage are both performed on the detection limit value Dlim, then even if there are changes in the motor temperature and the power supply voltage, the timing for energization mode switching can be determined based on a comparison between the pulse induced voltage and the threshold value, and energization mode switching can be performed sequentially.

Furthermore, in order to suppress that determination of the timing for energization mode switching is not performed due to sampling of the pulse induced voltage being performed within the oscillation period of the pulse induced voltage, or discontinuation of pulse voltage application while an A/D conversion is being performed, causing a false detection of the pulse induced voltage, the length of pulse voltage application time may be made longer. As a method of making the length of pulse voltage application time longer, pulse shifting described may be performed as described below.

The pulse shifting is a means for making the length of continuous voltage application time longer without changing the duty ratio, which is the sum of the voltage application time in a single cycle. Having performed this pulse shifting, if the duty ratio is restricted with the above detection limit value Dlim, it is possible to suppress the detection limit value Dlim to a low level while ensuring a wide variable range of the duty ratio.

Figure 16:
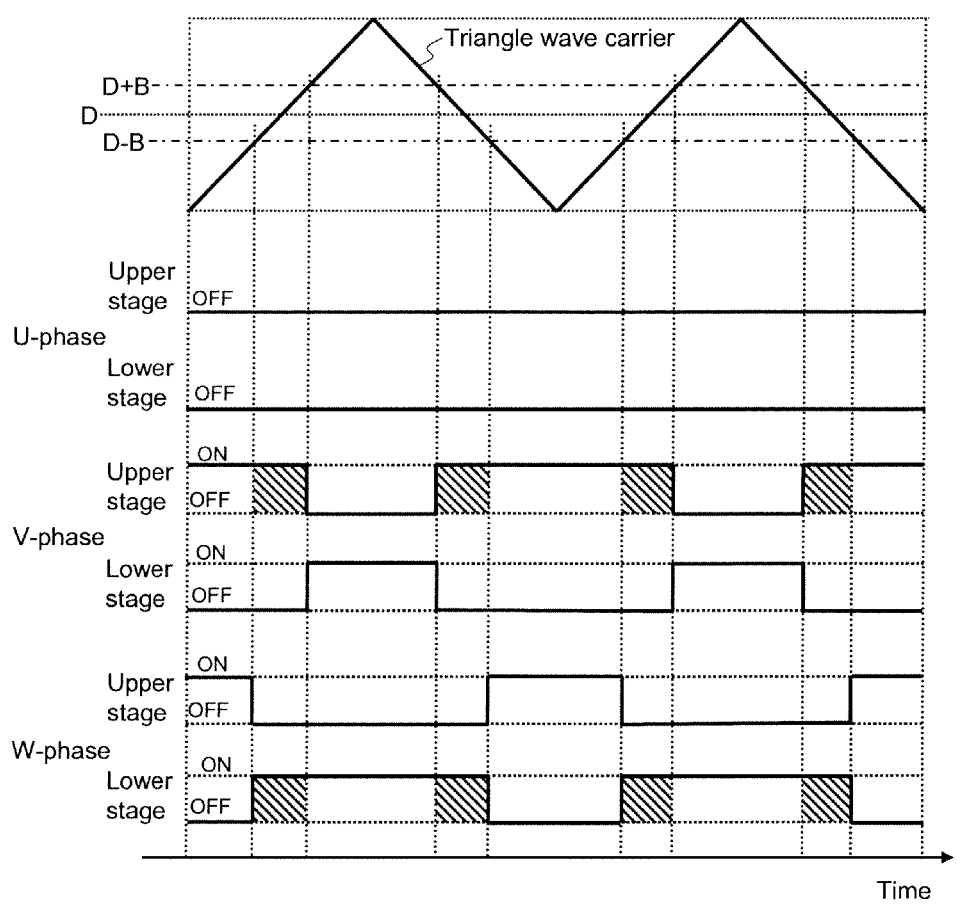
FIG. 16 is a time chart showing PWM signal generation in a case in which pulse shift is not performed in the first embodiment.

FIG. 16 shows typical PWM signal generation.

In FIG. 16, the value of the intermediate value D of the triangular wave carrier is voltage=0, and the voltage command value is B. Furthermore, the PWM signal of the V-phase uses the result of a comparison between the triangular wave carrier and the voltage command value D+B, and the PWM signal of the W-phase uses the result of a comparison between the triangular wave carrier and the voltage command value D−B.

That is to say, the upper stage switching element of the V-phase is turned ON in the period during which the voltage command value D+B is higher than the triangular wave carrier, and the lower stage switching element of the W-phase is turned ON in the period during which the triangular wave carrier is higher than the voltage command value D−B.

However, in the PWM signal generation shown in FIG. 16, when the duty is small, the pulse voltage application time, which is the length of time in which power is supplied to both of the V-phase and the W-phase (period illustrated with diagonal lines in FIG. 16), is short, and it is difficult to precisely detect the voltage being induced in the non-energized phase.

Figure 17:
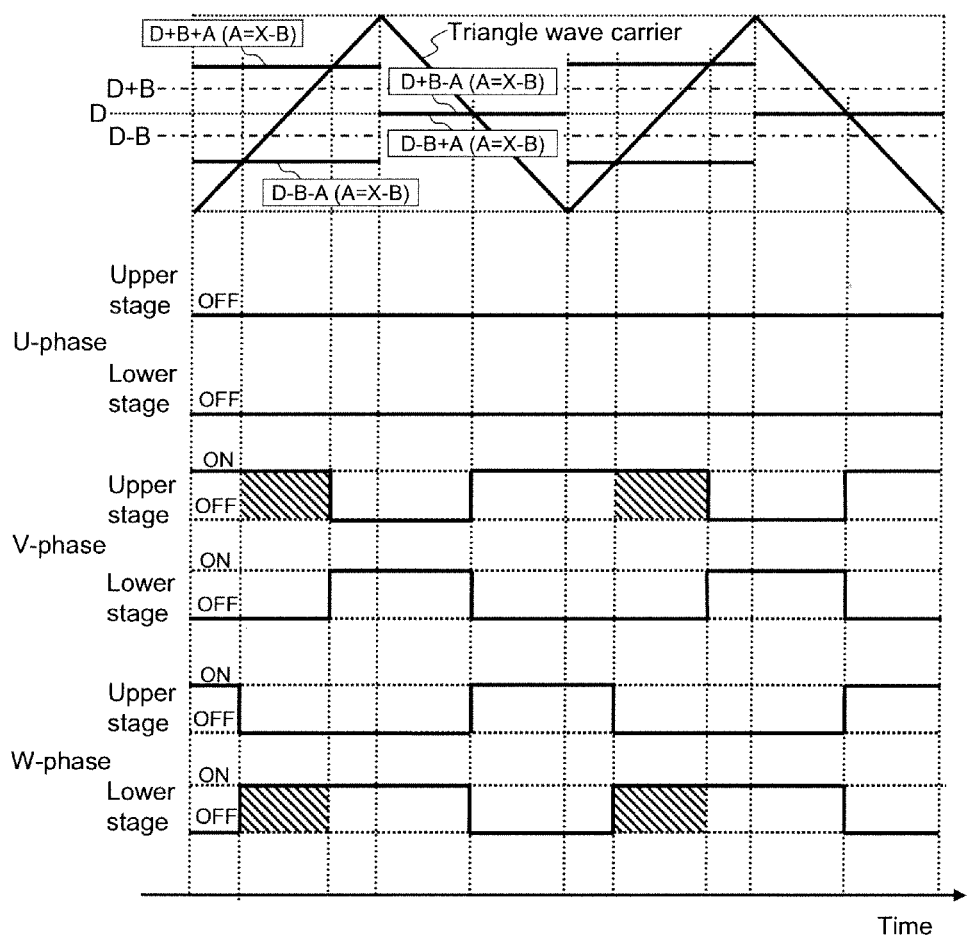
FIG. 17 is a time chart showing PWM signal generation in a case in which pulse shift is performed in the first embodiment.

Consequently, by performing the pulse shifting shown in FIG. 17, the continuous length of time during which power is supplied to both of these two phases at the same duty as that in the PWM signal generation shown in FIG. 17 (pulse voltage application time) is made longer, and thereby, it is possible to improve the detection precision of the voltage induced in the non-energized phase.

In the pulse shifting shown in FIG. 17, the voltage command value is corrected at the timings of peaks and valleys (ascending and descending) of the triangular wave carrier.

Specifically, in the ascending period of the triangular wave carrier, the voltage command value D+B is corrected to D+B+A (where A=X−B) and the voltage command value D−B is corrected to D−B−A (where A=X−B) so that the voltage command value departs from voltage=D only by X. In the descending period of the triangular wave carrier, the voltage command value D+B is corrected to D+B−A (where A=X−B) and the voltage command value D−B is corrected to D−B+A (where A=X−B) so that the voltage command value is brought to the vicinity of voltage=D.

With the above corrections of the voltage command value, the length of time during which power is supplied to both of the V-phase and the W-phase in the ascending period of the triangular wave carrier becomes longer in response to the length reduced in the length of time during which power is supplied to both of the V-phase and the W-phase in the descending period of the triangular wave carrier, and it is possible, without changing the duty (ON time in a single cycle), to make the length of continuous time during which power is supplied to both of the two phases (pulse voltage application time) longer. Furthermore, it is possible to suppress pulse induced voltage sampling from being performed within the oscillation period of the pulse induced voltage, or discontinuation of voltage application while an A/D conversion being performed.

Second Embodiment

Next, a second embodiment of the present invention is described. The same configurations as those in the first embodiment are given the same reference symbols, and descriptions thereof are simplified or omitted.

A motor control device 3 in the second embodiment differs from that of the first embodiment in that in motor drive control of step S304, in the case in which the target duty Dt becomes less than the detection limit value Dlim, N is provided as a fixed value without setting the detection timing for detecting the terminal voltage of the non-energized phase, that is to say, step S349 in FIG. 5 is omitted.

Figure 18:
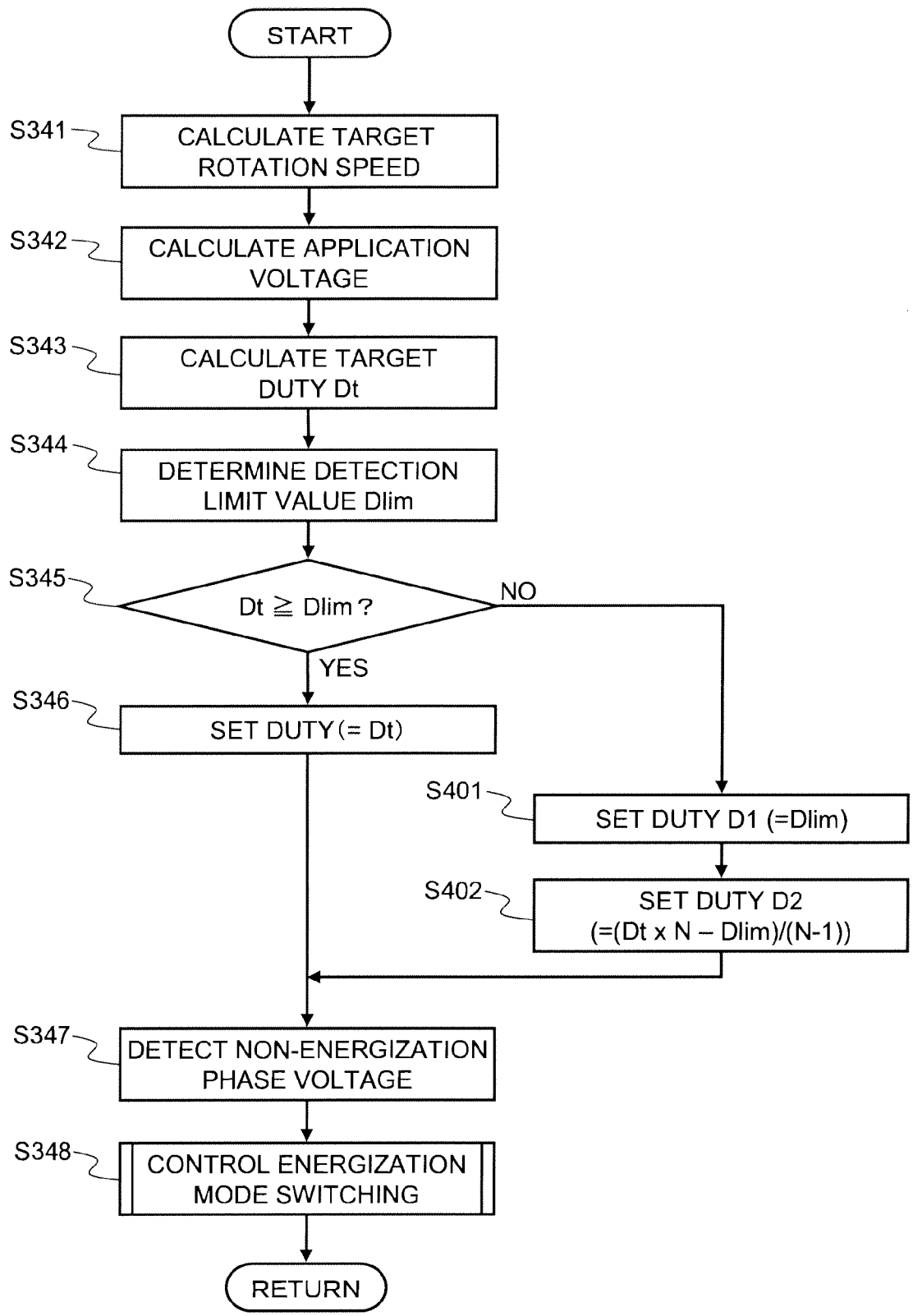
FIG. 18 is a flow chart showing details of a drive control of a brushless motor in a second embodiment.

FIG. 18 is a flow chart showing details of motor drive control of step S304 in the case in which N is fixed at N=2, in the second embodiment.

In step S401, based on fixed detection timing (once every two cycles according to the cycle of PWM signals) stored in a ROM (read-only-memory) or the like of controller 213, the detection time duty D1 at the time of performing detection once among two detections, is set as the detection limit value Dlim.

In step S402, the non-detection time duty D2 for when detection is not performed once among two detections, is set according to the following equation.

$$D2 = \text{target duty } Dt \times 2 - \text{detection limit value } D\text{lim}$$

According to motor drive device 3 in the second embodiment, in the case in which the target duty Dt becomes less than the detection limit value, there is no need for setting the detection timing for detecting the terminal voltage of the non-energized phase, and therefore, it is possible to reduce the calculation load on controller 213.

The entire contents of Japanese Patent Application No. 2011-204733, filed on Sep. 20, 2011, on which priority is claimed, are incorporated herein by reference.

While only a select embodiment has been chose to illustrate and describe the present invention, it will be apparent to those skilled in the art from this disclosure that various changes and modifications can be made herein without departing from the scope of the invention defined in the accompanying claims.

Furthermore, the foregoing description of the embodiments according to the present invention is provided for illustration only, and it is not for the purpose of limiting the invention, the invention as claimed in the appended claims and their equivalents.

What is claimed is:

1. A brushless motor drive device, comprising:
    a controller configured to control switching energization modes for applying a pulse voltage according to a pulse width modulation signal to two phases of a three-phase brushless motor, based on a pulse induced voltage induced in a non-energized phase, and
    a voltage detector configured to detect the pulse induced voltage at a predetermined detection timing according to a cycle of the pulse width modulation signal,
    wherein when a duty ratio of the pulse width modulation signal is less than a predetermined value, the controller is configured to restrict a detection time duty ratio, which is a duty ratio of the pulse width modulation signal at the predetermined detection timing, by the predetermined value, and set a non-detection time duty ratio that is a duty ratio of a pulse width modulation signal when the pulse induced voltage is undetected,
    wherein the setting of the non-detection time duty ratio controls an average duty ratio between successive predetermined detection timings, which average duty ratio is an average of the non-detection time duty ratio and a detection time duty ratio that is restricted by a predetermined value.

2. The brushless motor drive device according to claim 1, wherein the controller is configured to set the non-detection time duty ratio such that the average duty ratio approaches a duty ratio of a pulse width modulation signal according to a manipulated variable of the brushless motor.

3. The brushless motor drive device according to claim 1, wherein the controller is configured to change the predetermined detection timing based on at least one of an actual rotation speed of the brushless motor, and a manipulated variable of the brushless motor.

4. The brushless motor drive device according to claim 1, wherein when an actual rotation speed of the brushless motor or a target rotation speed according to a manipulated variable of the brushless motor is greater than or equal to a predetermined rotation speed, the controller is configured to set the predetermined detection timing to correspond to every cycle of a pulse width modulation signal.

5. The brushless motor drive device according to claim 1, wherein the controller is configured to fix the predetermined detection timing in a case in which the duty ratio of the pulse width modulation signal is less than the predetermined value.

6. The brushless motor drive device according to claim 1, wherein the brushless motor drives an electric water pump to circulate circulation water within a vehicle.

7. The brushless motor drive device according to claim 1, wherein the controller is configured to incrementally correct the predetermined value according to an increase in temperature of the brushless motor.

8. The brushless motor drive device according to claim 7, wherein:
    the controller is configured to learn a threshold value by setting the predetermined value as a duty ratio of the pulse width modulation signal, compare the threshold value with the pulse induced voltage, and derive a timing for switching the energization mode from the threshold value, and
    the increase in temperature of the brushless motor is an increase in temperature at a time when the controller learns the threshold value.

9. The brushless motor drive device according to claim 1, wherein the controller is configured to incrementally correct the predetermined value according to a reduction in a power supply voltage of the brushless motor.

10. The brushless motor drive device according to claim 9, wherein:
    the reduction in the power supply voltage of the brushless motor is a reduction from the power supply voltage at a time when the controller learns a threshold value, by setting the predetermined value as a duty ratio of the pulse width modulation signal, and
    the controller is configured to compare the threshold value with the pulse induced voltage and to determine a timing for switching the energization mode based on the threshold value.

11. The brushless motor drive device according to claim 1, wherein the controller is configured to set the predetermined value with a duty ratio in a case of applying the pulse voltage during a period of time that is a sum of a length of time, during which the pulse induced voltage changes immediately after commencing application of the pulse voltage, and a length of time required for A/D converting the pulse induced voltage.

12. The brushless motor drive device according to claim 1, wherein the controller is configured to set the predetermined value with a duty ratio in a case of applying a pulse voltage during a period of time that is at least twice as long as a longer one of a length of time, during which the pulse induced voltage changes immediately after commencing an application of the pulse voltage, and a length of time required for A/D converting the pulse induced voltage.

13. The brushless motor drive device according to claim 1, wherein the controller is configured to set the predetermined value as a duty ratio of the pulse width modulation signal in a case of learning a threshold value that the controller compares with the pulse induced voltage and based on which the controller determines the timing for switching the energization mode.

14. The brushless motor drive device according to claim 1, wherein the controller is configured to set the predetermined value based on at least one of an oscillation time of the pulse induced voltage, an A/D conversion time of the pulse induced voltage, and difference between a reference voltage which is compared with the pulse induced voltage as a threshold value for switching the energization modes, and the pulse induced voltage.

* * * * *